Dec. 8, 1925.

W. VAGEDES 1,565,124

PROTECTING COVER FOR BANK NOTES, BONDS, AND THE LIKE

Filed March 7, 1925

Patented Dec. 8, 1925.

1,565,124

UNITED STATES PATENT OFFICE.

WILHELM VAGEDES, OF MUNSTER, GERMANY.

PROTECTING COVER FOR BANK NOTES, BONDS, AND THE LIKE.

Application filed March 7, 1925. Serial No. 13,893.

*To all whom it may concern:*

Be it known that I, WILHELM VAGEDES, a citizen of the German Republic, residing at Munster, Westphalia, Germany, have invented certain new and useful Improvements in Protecting Covers for Bank Notes, Bonds, and the like, of which the following is a specification.

This invention relates to a protecting cover for banknotes, bonds and other valuable papers, and it is characterized by the fact that a box protecting case includes a lid with flaps at both ends which when the box is closed, engage behind plates on the ends of the protecting case whereby the box is held together.

A protecting cover of this type is a practical receptacle for storing in handy piles valuable papers so that they are protected against dust, and it is especially adapted to be used in banks, pay-offices and the like.

Figure 1:
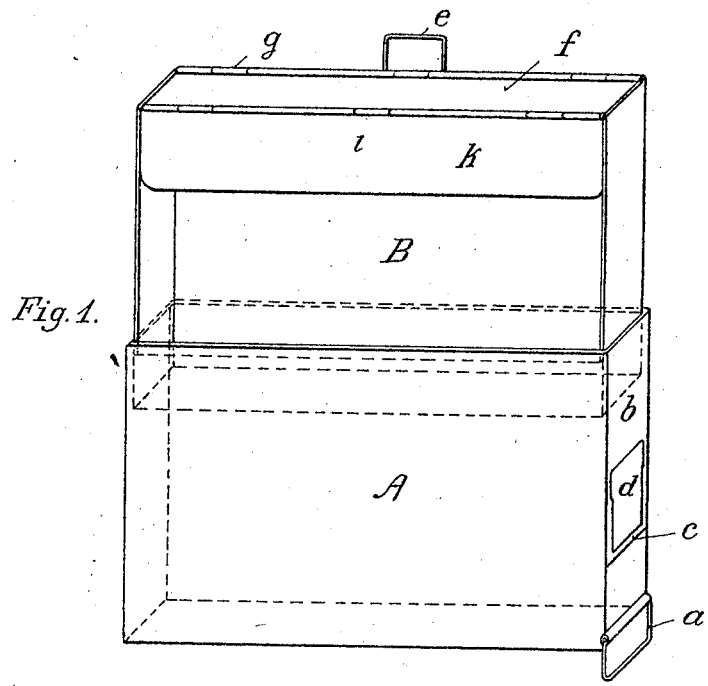

An embodiment of the invention is shown by way of example in the accompanying drawings in which Fig. 1 shows in front elevation the two parts of the protecting cover.

Figure 2:
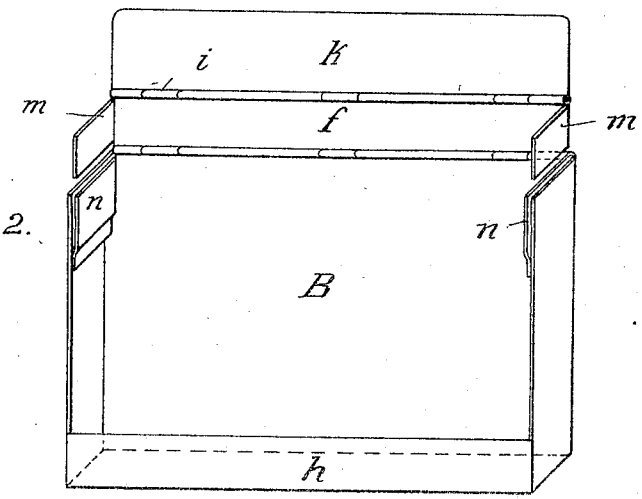

Fig. 2 shows the box alone the front wall being lowered.

A case A, having a ring $a$ or other handle, is provided on the short side wall $b$ with a grooved frame $c$ designed to receive a ticket $d$ with inscription, describing the contents of the box. A box B is telescoped into this case A. This box B has a ring $e$ or other handle on the bottom plate adjacent to the hinge. The lid $f$ is hinged to the box D by a piano hinge $g$. On the other side of box B a narrow wall $h$ is fixed designed to securely hold the papers in the box. On the lid $f$ a flap $k$ is fixed by means of a hinge $i$. Flaps $m$ are arranged, one at either end of the lid $f$ and designed to engage behind corresponding plates $n$ fixed on the inner surface of the ends of the box when the lid $f$ is closed.

The protecting cover is made from sheet aluminium, although other material, for instance wood, cardboard or the like may be used.

I claim:—

Protecting cover for bank notes, bonds and other valuable papers, comprising in combination a protecting case open at one end, a box telescoped in said protecting case said box being open at one long side, a plate fixed on the inner surface of each end of said box at a short distance from this surface, a lid hingedly fixed to the free end of the bottom of said box, a flap at each end of said lid and designed to engage behind said plates, and a covering flap hingedly fixed on the free edge of said lid.

In testimony whereof I affix my signature.

WILHELM VAGEDES.